United States Patent [19]
Ingelman et al.

[11] Patent Number: 5,972,228
[45] Date of Patent: Oct. 26, 1999

[54] FILTERS EMPLOYING "FILLING BODIES" TO REDUCE THE AMOUNT OF BACKWASHING FLUID REMAINING IN THE FILTERS AFTER BACKWASHING

[75] Inventors: Magnus Ingelman, Avesta; Hans-Åke Karlsson, Hedemora; Per Larsson, Avesta; Martin Wimby, Göteborg; Anita Markusson, Molkom, all of Sweden

[73] Assignee: Kvaerner Pulping Technologies AB, Sweden

[21] Appl. No.: 08/793,996

[22] PCT Filed: Sep. 7, 1995

[86] PCT No.: PCT/SE95/01002

§ 371 Date: May 15, 1997

§ 102(e) Date: May 15, 1997

[87] PCT Pub. No.: WO96/08300

PCT Pub. Date: Mar. 21, 1996

[30] Foreign Application Priority Data

Sep. 13, 1994 [SE] Sweden ............................. 9403052-5

[51] Int. Cl.⁶ .............................. B01D 37/00; B01D 35/00
[52] U.S. Cl. ......................... 210/771; 210/797; 210/798; 210/323.2; 210/333.01; 210/333.1; 210/340; 210/416.1; 210/483
[58] Field of Search .................................... 210/768, 769, 210/770, 771, 791, 797, 798, 333.01, 323.2, 340, 346, 333.1, 416.1, 483

[56] References Cited

U.S. PATENT DOCUMENTS

| | | |
|---|---|---|
| 4,210,536 | 7/1980 | Coplan et al. ........................ 210/323.2 |
| 4,265,771 | 5/1981 | Lennartz ............................... 210/323.2 |
| 4,289,630 | 9/1981 | Schmidt ................................ 210/323.2 |
| 4,547,296 | 10/1985 | Sim et al. ............................... 210/778 |
| 4,818,420 | 4/1989 | Mims ...................................... 210/798 |
| 4,923,068 | 5/1990 | Crowson ................................. 210/741 |
| 5,013,457 | 5/1991 | Mims . |
| 5,149,449 | 9/1992 | Strid et al. ............................. 210/798 |
| 5,618,443 | 4/1997 | Engdahl ................................. 210/188 |
| 5,620,596 | 4/1997 | Engdahl ................................. 210/188 |

FOREIGN PATENT DOCUMENTS

| | | |
|---|---|---|
| 145 842 | 6/1985 | European Pat. Off. . |
| 382 097 | 8/1990 | European Pat. Off. . |
| 27 04 672 | 8/1978 | Germany . |
| 153 999 | 4/1956 | Sweden . |
| 443 815 | 3/1986 | Sweden . |
| 501 068 | 11/1994 | Sweden . |
| 596 872 | 3/1978 | Switzerland . |

*Primary Examiner*—Robert J. Popovics
*Attorney, Agent, or Firm*—Quarles & Brady

[57] ABSTRACT

A filtering apparatus comprises: a pressure vessel; a plurality of filter elements arranged within the pressure vessel, the filter elements each having an upper end, a lower end and a side wall; filling bodies positioned within the filter elements; a first conduit for introducing compressed gas into the pressure vessel; a second conduit for transporting unfiltered liquid to and from the pressure vessel; and a third conduit for removing filtrate from the pressure vessel and transporting back-flushing liquid to and from the filter elements, the third conduit positioned proximate to a bottom portion of the pressure vessel and attached to the lower ends of the filter elements, such that the third conduit provides a support structure for the filter elements and the back-flushing liquid introduced via the third conduit fills the filter elements in a direction from the lower ends toward the upper ends, the volume of back-flushing liquid introduced into the filter elements limited by the filling bodies. A method of operating the filtering apparatus is also disclosed.

17 Claims, 3 Drawing Sheets

FILTERS EMPLOYING "FILLING BODIES" TO REDUCE THE AMOUNT OF BACKWASHING FLUID REMAINING IN THE FILTERS AFTER BACKWASHING

BACKGROUND OF THE INVENTION

1. Field of the Invention

The present invention relates to a process and to equipment for filtration of liquids. More specifically, this invention relates to a new and improved method and device for the filtration of a suspension and the back flushing of filter elements.

2. Description of Related Art

A process for filtration of a green liquor suspension by means of filtering in a pressure filter has previously been disclosed in SE-B-443,815. The process involves the suspension being introduced into the lower part of a pressure vessel which contains a number of filter elements hanging down together from a partition wall. During the filtration stage, filtrate flows through these filter elements and is conveyed away from the upper part of the pressure vessel above the said wall. Sludge collected on the surface of the filter elements is released intermittently by means of so-called counter current washing. After the washing, and after the liquid, including accumulated sludge, has subsequently been pumped away, the process is repeated.

A process and a device for filtering suspensions has previously been disclosed in SE-A-8903267-6. In this case, a pressure filter is utilized which has vertically arranged filter elements. During the regeneration process, the deposited material is first dried and back-flushing is then carried out in order to remove this material from the filter cloth. The pressure vessel was drained of unfiltered suspension prior to the regeneration phase.

In both these processes, the back-flushing is carried out by the filter elements being supplied with the back-flushing medium from above. Medium which is present in the filter elements and which is not utilized for the back-flushing itself is allowed to dilute the filtrate and/or the secondary suspension containing the sludge.

Another proposal has been, in the case of a pressure filter which has been marketed under the name "Cricket filter" by the company Ama Filter, to initiate the back-flushing of flat filter elements, which hang down from an upper structure, from the area of their lower part in order thereby to improve the characteristics associated with the back-flushing. However, the back-flushing liquid is supplied from above and the liquid present in the filter element has no possibility of self-draining.

SUMMARY OF THE INVENTION

An object of the present invention is to improve a process and equipment of the type initially mentioned such that the problems associated with the known arrangements are overcome. A further object of the invention is to indicate a process and equipment which can be implemented at comparatively low cost and which involve uncomplicated technology.

These objects are achieved for a process of the type initially mentioned by means of a method for filtering a suspension in which the suspension is transported under pressure from a tank to a discontinuously operated pressure filter, the filter including a plurality of filter elements arranged within a pressure container, and the filter elements having filling bodies located therein. The method comprising the steps of: (a) separating the suspension into filtrate and sludge, separating the suspension into filtrate and sludge, the sludge becoming caked on an exterior of the filter elements; (b) allowing the filtrate to run down an interior surface of the filter elements; (c) conducting the filtrate out of the pressure vessel; (d) emptying an unfiltered portion of the suspension from the pressure vessel; (e) drying the caked-on sludge by supplying a gas into the pressure vessel; (f) back-flushing the filter elements using a back-flushing liquid introduced through a bottom side of the pressure vessel into the interior portion of the filter elements, at least a portion of the back-flushing liquid directed through the filter elements and combining with the sludge to form a slurry, and at least a portion of the back-flushing liquid remaining within the interior of the filter elements; and (g) emptying the slurry from the pressure vessel, whereby, the portion of back-flushing liquid remaining within the interior of the filter elements flows down the interior of the filter elements for conduction out of the pressure vessel, and the portion of back-flushing liquid remaining within the interior of the filter elements is limited by the filling bodies. By these means, important advantages are gained in relation to the known technology. Thus, the advantage is achieved that the back-flushing liquid is caused, in a simple manner, to act from the bottom and upwards in the filter elements, as a result of which a back-flushing is obtained which is more efficient in effectively removing the sludge cake over the whole extent of the filter elements. The fact that filtrate or, respectively, unused back-flushing liquid is allowed to leave the filter elements "unaided" limits the need for equipment and efficiently limits the quantity of back-flushing liquid utilized to a minimum or, respectively, prevents dilution of filtrate. The conduct of the liquid out of the pressure vessel likewise preferably takes place unaided, but can also be supported by pumping action.

Additionally the supply of gas for drying the sludge cake can be already initiated during the step of emptying of unfiltered suspension with the gas supplied at a pressure which is sufficient to prevent the sludge cake from falling down from the filter elements. This feature efficiently limits the quantity of back-flushing liquid still further, since the possibility is provided for appreciably limiting available volume inside the filter elements.

The back-flushing liquid can also be a secondary condensate or a medium, such as water, which has been freed of filtrate chemicals. This feature provides the possibility of efficient displacement drying of deposited sludge and also ensures that the deposited sludge cake remains behind on the surface of the filter elements during the phase for draining suspension which has not been filtered.

The back-flushing liquid can be directed in sequence to one or more sections of filter elements per constituent sequence. This feature causes the slurry containing the sludge to be freed from chemicals to an even greater extent.

The invention also provides a filtering apparatus, comprising: a pressure vessel; a plurality of filter elements arranged within the pressure vessel, the filter elements each having an upper end, a lower end and a side wall; filling bodies positioned within the filter elements; a first conduit for introducing compressed gas into the pressure vessel; a second conduit for transporting unfiltered liquid to and from the pressure vessel; and a third conduit for removing filtrate from the pressure vessel and transporting back-flushing liquid to and from the filter elements, the third conduit positioned proximate to a bottom portion of the pressure vessel and attached to the lower ends of the filter elements, such that the third conduit provides a support structure for the filter elements and the back-flushing liquid introduced via the third conduit fills the filter elements in a direction from the lower ends toward the upper ends, the volume of back-flushing liquid introduced into the filter elements limited by the filling bodies. This equipment results in appreciable advantages with regard to regulating and arranging the back-flushing phase.

The equipment according to the invention can also be provided such that the third conduit is the only structure for supporting the filter elements. By means of these features, the advantages are gained that the back-flushing liquid is caused, simply and efficiently, to act on the filter elements from the bottom and upwards and that liquid (filtrate or back-flushing liquid, respectively) remaining in the filter elements is caused, simply and efficiently, to leave the filter elements prior to the next phase in the filtration cycle. This has the effect of minimizing the quantity of back-flushing liquid used and of minimizing dilution of the filtrate.

The third conduit can also comprise a main conduit branching off into a series of subconduits, at least one of said subconduits passing through the wall of said pressure vessel. By means of this feature, the advantage is gained of simple and appropriate support, or conduit laying, for the filter elements, something which is accentuated by tubular filter elements. Use of a structure having conduits which are limited in extent means that there are no impediments for the downward drainage of the slurry which is formed during the back-flushing.

The filter elements can be shaped from perforated plates having a layer of filter cloth affixed thereon which results in an especially preferred and appropriate design of the filter elements, which design ensures increased resistance to deformations arising from the prevailing pressure differences.

The filter apparatus can further comprise at least one layer of an underwire arranged between the filter cloth and the perforated plate, with the layer of underwire having a coarser structure and greater permeability than the filter cloth. This feature results in a suitable design of the walls of the elements and filling bodies designed to fill up an internal space of the filter elements, such that a narrow gap is formed between each filling body and respective filter element side wall leads to advantages which are associated on the one hand with absorbing deformations which do arise and on the other hand with extending and increasing the effective filter area of the filter cloth.

The filling bodies can be arranged to constitute members which stiffen the filter elements which constitutes an especially preferred embodiment, and in particular wherein the filling bodies consist of elements of expanded synthetic material, the advantages are gained which have been discussed above in connection with having he supply of gas for drying the sludge cake already initiated during the step of emptying of unfiltered suspension with the gas supplied at a pressure which is sufficient to prevent the sludge cake from falling down from the filter elements.

The filtering apparatus can further comprise a fan which is arranged to generate compressed gas for drying deposited sludge cake. An advantage is gained of increased freedom when designing the filter elements with regard to their dimensions and their actual external shape. The fan can be arranged to generate a pressure which is adapted to permit retention of sludge cake on the filter elements while emptying unfiltered suspension and drying said sludge cake. This feature represents an especially cost-effective solution for the design and application of the filler bodies within the filter elements.

BRIEF DESCRIPTION OF THE DRAWINGS

The invention will now be discussed in more detail in association with an embodiment and with the guidance of the attached drawings, of which.

DETAILED DESCRIPTION OF THE PREFERRED EMBODIMENTS

Figure 1:
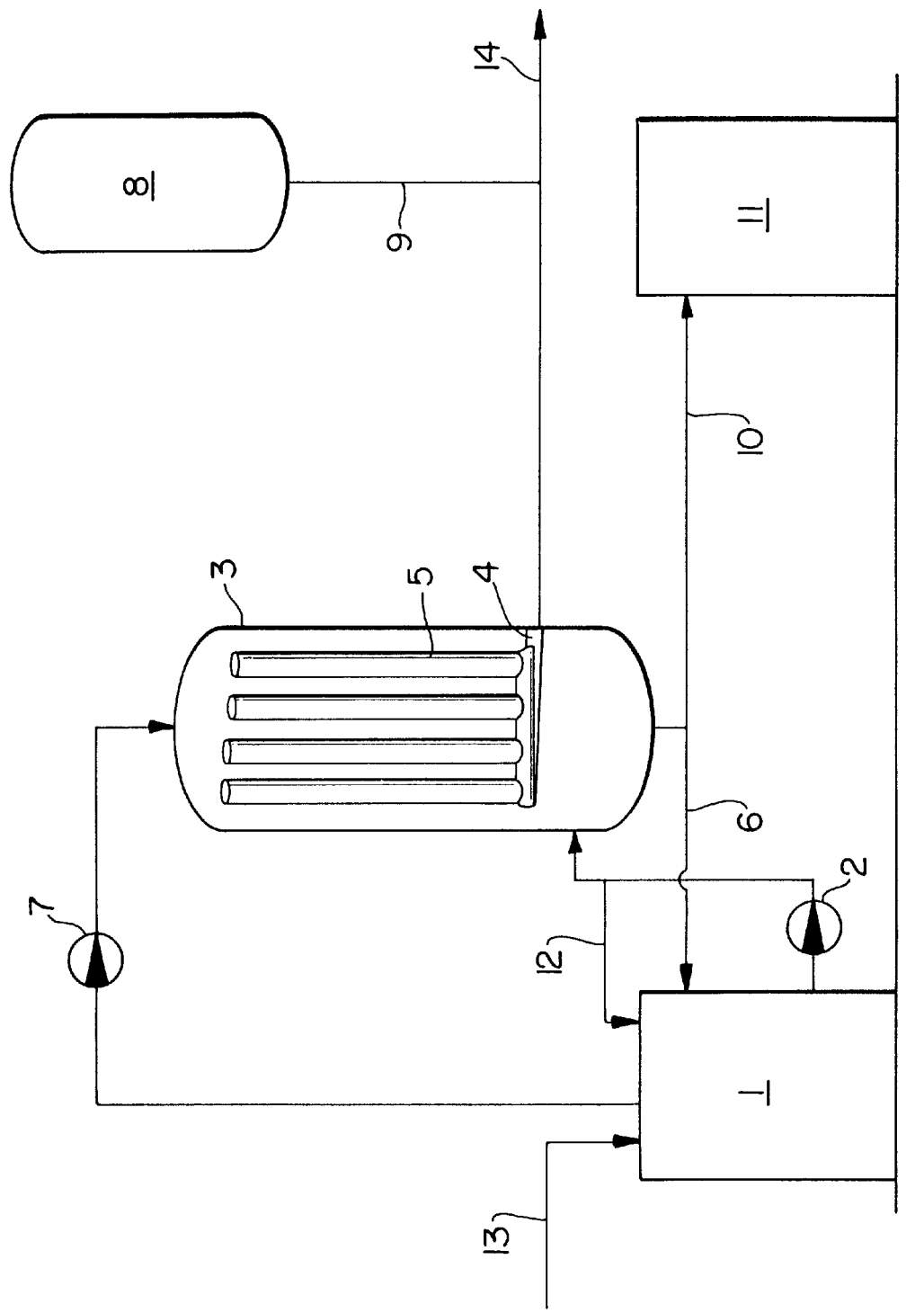
FIG. 1 shows an outline diagram of the process according to the invention.

FIG. 1 shows the principle of the present process in association with filtering turbid green liquor which is included in the chemical circuit of a causticization process. Here, 1 designates an equalization tank for equalizing variations in the sludge content of turbid green liquor, which is conducted in from a dissolving tank via the inlet 13. The green liquor is transported from the equalization tank with the aid of a pump 2, which is preferably operating continuously, to the cylindrical filter pressure vessel 3 which is in this case essentially circular. The filtration device consists of filter elements, which are present in the pressure vessel 3, in the form of tube filters 5 which are mounted vertically upright from a support structure 4. The tubes 5 are expediently covered with a filter cloth of a quality which eliminates the need for a precoat layer for the filtration. In this embodiment, the body walls of the tubes 5 consist of perforated plate cylinders and an underwire or cloth of a coarser, more pervious, quality is preferably arranged between their plate walls and the filter cloth in order to compensate deformations and to increase the effective filter area of the filter cloth.

The filtration cycle is carried out as follows. Once the pressure vessel 3 has been filled with turbid green liquor to the desired level, the pump 2 is used to increase the pressure inside the vessel, which pressure is preferably between 1 and 5 bar. After that, the filtration proceeds, while pumping is continued, for a period which depends, inter alia, on the filterability of the turbid green liquor, but can typically amount to about 15 to 60 minutes. During the filtration stage, sludge is deposited continuously on the filter cloth in association with a simultaneous increase in the pressure drop across the cloth. The flow from the pump 2, which is preferably a constant flow, entails a gradual increase in the pressure up to, for example, approximately 4 to 5 bar in the final phase. Substantially higher pressures can also occur. However, in the case of white liquor filtration, for example, other pressures and times apply, where appropriate.

After the filtration phase has been completed, the unfiltered green liquor is drained back to the equalization tank 1 via the conduit 6, a process which, in the embodiment example under discussion, takes approximately 1 minute. In connection with this, the fan 7 maintains a certain degree of excess pressure in the vessel 3 during the drainage, which excess pressure on the one hand results in drying by means of pressing filtrate, which is present in the sludge cake, through the filter cloth using air, and on the other hand is adapted for retaining the sludge cake on the filter cloth so that sludge does not fall down into unfiltered suspension during the drainage phase. After the emptying, air coming from the fan 7 is used to dry the sludge cake on the tubes 5 further over a period which is typically about 10 seconds. The suction side of the fan 7 is preferably coupled to the upper part of the equalization tank 1.

After the drying sequence has been completed, the filter 3 is back-flushed by hot water or condensate, which is stored in a back-flushing pressure tank 8, being pressed in via the conduit 9, through the conduit structure 4 and out through the tubes 5 in the direction from the bottom and upwards. Back-flushing of this nature entails considerably greater certainty that the filter cloth really is flushed clean as compared with the situation where, as in the known technique, the flushing takes place from the top and downwards. The requirement for back-flushing liquid is further decreased substantially by filling bodies having been arranged in the tubes 5. In this process, the back-flushing liquid and the sludge which has been released from the filter form a slurry which runs down to the bottom of the pressure vessel 3 and, from there, is emptied via the conduit 10 into a sludge pumping tank 11. In the embodiment example, the duration of this sludge emptying is about 1 minute. This completes the filtering cycle and a new cycle can be started.

As has been mentioned above, the pump 2 preferably operates continuously, inter alia for technical reasons to do with regulation, during the whole of the filtering cycle, while, once the filtration phase has been accomplished, the turbid green liquor is circulated back to the equalization tank during the remaining phases.

Many important advantages are gained when using the novel process and equipment for green liquor filtration. Thus, owing to the low content of sludge, the possibility is gained of packing the tubes very closely together, resulting in a very large effective filter area. In addition, the advantage is gained that the departing sludge has a low pH, i.e. there is a low content of alkali metal salt in the outgoing slurry (in this case, typically between 5 and 15 gram/liter), thereby rendering it possible to dump the waste directly without it being considered to be harmful waste. Another aspect of this is that the chemicals remain, to a large extent, in the circuit, and it can be mentioned at this point that the losses in a process according to the invention are as low as 0.25 to 0.5% of the green liquor introduced into the circuit.

The advantage of the process and the equipment according to the invention is thus that a very high level of performance is obtained using relatively simple and robust means. As a comparison, it can be mentioned that the system in accordance with SE-B-8903267-6 involves a closed system both upstream and downstream of the filtration pressure vessel while in accordance with the invention it is only the pressure vessel itself which is pressurized.

Figure 2:
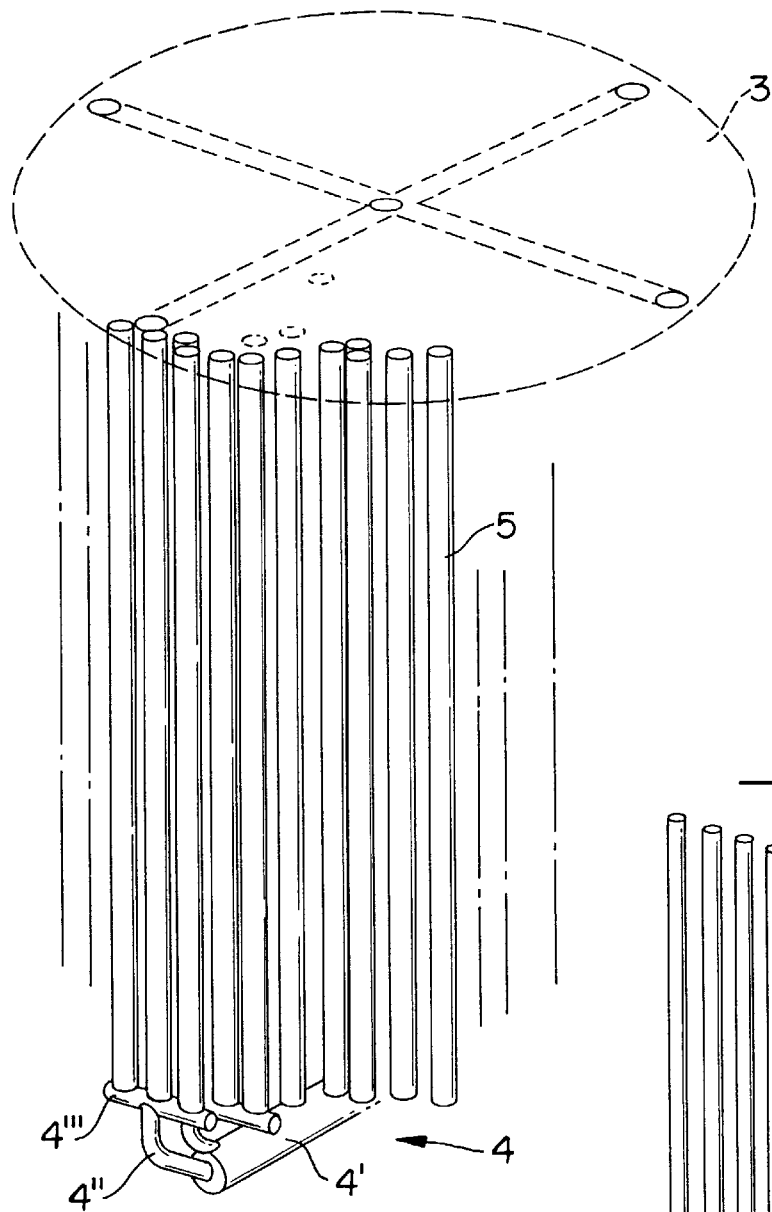
FIG. 2 shows the principle of the packing of filter elements in the pressure vessel of an equipment in accordance with the invention.

Returning to the embodiment example, reference is now made to FIG. 2, which shows the arrangement of a number of elongated, narrow, tube-shaped filter elements 5 in a pressure vessel 3, which is only intimated. At their lower ends, the elements are supported by the structure 4, which consists of successively branching pipes, with an inlet/outlet 4' branching into intermediate conduits 4", which are connected to the horizontal pipe segments 4"' which carry the vertical tubes 5. As can be seen, this design allows the filter elements to he tightly packed while at the same time ensuring that slurry running down from the filter elements during the back-flushing can efficiently pass by the structure 4 in order to reach the bottom of the pressure vessel 3 (FIG. 1).

Figure 3:
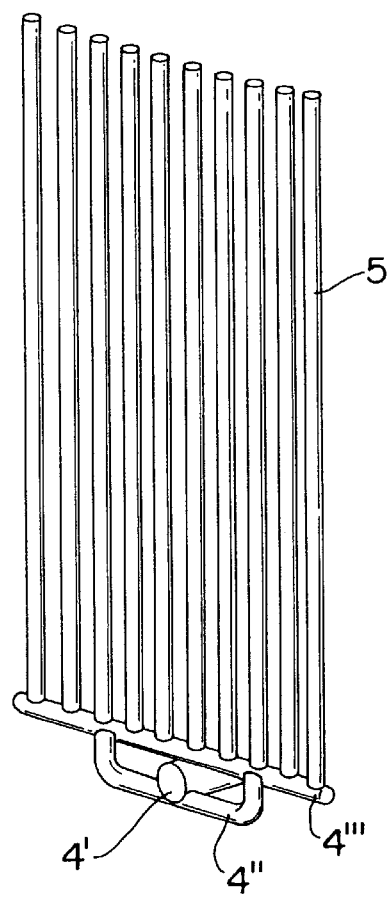
FIG. 3 shows a group of filter elements in accordance with FIG. 2.

FIG. 3 shows a group of filter tubes 5 which, in the embodiment example, are thus arranged in rows, distributed along the conduit segment 4"'. There is also a clearer depiction of the connection from the intermediate conduit 4", which conduit, in this case, consists of a flattened U-shaped construction, which is connected by means of its shank parts to the underside of the said conduit segment 4"' and which centrally, at its lower part, exhibits the area for linking to the larger conduit 4. In order to fit into a circular/cylindrical pressure vessel, the rows of filter elements are naturally adapted, as regards number, to the available space.

In a preferred embodiment, the filter elements are divided into a number of sections, for example six sections, which, during the back-flushing, are back-flushed in sequence after each other. Many advantages are gained in this way, including reducing the flow volume to only a fraction (in this case, as an example, ⅙) of that required if the whole filter is back-flushed at once. This results in the requirement for narrower conduits and also, perhaps, a smaller pressure vessel for the back-flushing liquid, together with more reliable cleaning and a back-flushing which is generally simpler to control. If a tube breaks down, the section containing this tube can be identified and closed off by means of a valve so that the filter can be operated using the intact sections. Repair is also simplified, since it can be arranged that only the section which has broken down has to be replaced, rather than the whole filter cassette.

A flushing sequence with a filter of this type containing six sections can also be carried out by back-flushing two sections simultaneously, and then the next two and finally the last two sections. In this case, therefore, the back-flushing is divided into three sequential flushings. In order to flush a filter totally, a certain quantity of flushing liquid is consumed, which quantity is distributed over three flushings, thereby achieving the abovementioned advantages.

Figure 4:
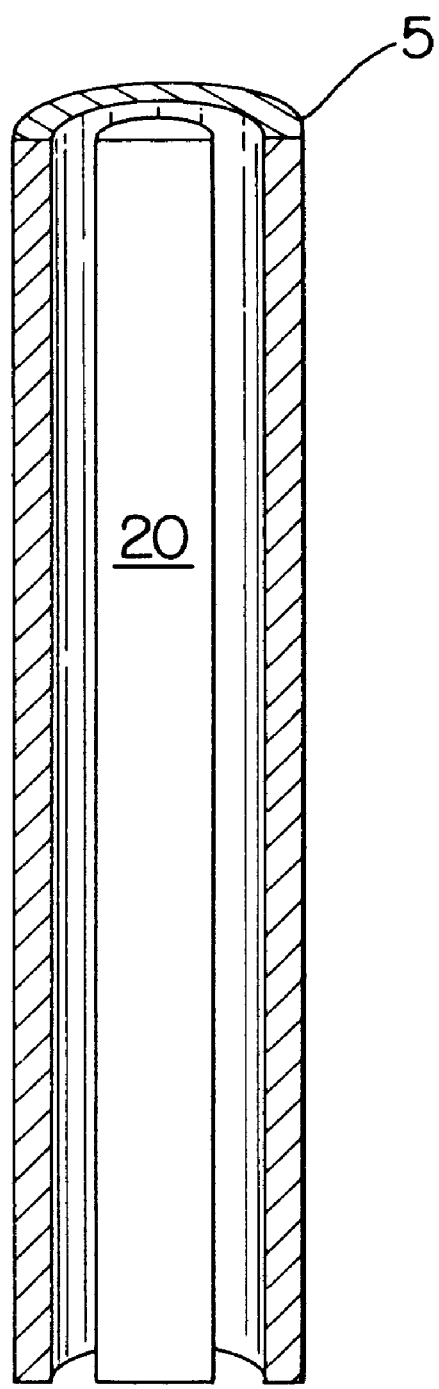
FIG. 4 is a cross-sectional view of an individual filter element and an associated filling body.

Referring now to FIG. 4, in order to minimize still further the quantity of back-flushing liquid used, the filter elements (the tubes) 5 are preferably provided with filling bodies 20, which bodies occupy a substantial part of the inner volume of the tubes. In a preferred example, the filling bodies consist of a metal construction which in the main fills up the elements in a complementary manner, except for a gap-shaped space nearest to the inner walls of the element bodies. In order to maintain the distance to the inner walls of the elements, the filling bodies are preferably equipped with distancing members. In one embodiment, the filling body is star-shaped in cross section, with the tips of the star shape making contact with the inner walls of the elements. In order to increase latitude when determining the dimensions and the geometric shape of the filter elements 5, the filling bodies can constitute stiffening members for the filter-element bodies. The stiffening effect can be achieved by means of intermediate strips, seams, flanges or the like, which also serve as distancing members. In another embodiment example, the filling bodies consist of expanded synthetic material which can readily be adapted to the inner shape of the filter elements. In this case, the filling bodies can consist of integrated unitary bodies or of a number of smaller parts which fill up the filter elements.

The proportion of the total available space in the inner volume of the filter element which is represented by the filling body can vary, for instance in the light of the geometry of the elements. In this context, the proportion represented by the filling body, or the degree of filling, is preferably greater than 30%, and a degree of filling of approximately 50%–70% has been found to be suitable.

It should be pointed out that details shown and discussed in the embodiment example can be varied within the scope of the patent claims. Thus, the bodies of the filter elements can be designed other than as perforated plate cylinders. In this context, other forms can be used, as can another body material. For example, in a variant of the invention, filter lamellae can be used instead of filter tubes.

We claim:

1. A method for filtering a suspension, the suspension transported under pressure from a tank to a discontinuously operating pressure filter, the filter including a plurality of filter elements arranged within a pressure container, the filter elements having filling bodies located therein, the method comprising the steps of:

(a) separating the suspension into filtrate and sludge, the sludge becoming caked on an exterior of the filter elements;

(b) allowing the filtrate to run down an interior surface of the filter elements;

(c) conducting the filtrate out of the pressure vessel;

(d) emptying an unfiltered portion of the suspension from the pressure vessel;

(e) drying the caked-on sludge by supplying a gas into the pressure vessel;

(f) back-flushing the filter elements using a back-flushing liquid introduced through a bottom side of the pressure vessel into the interior portion of the filter elements, at least a portion of the back-flushing liquid directed through the filter elements and combining with the sludge to form a slurry, and at least a portion of the back-flushing liquid remaining within the interior of the filter elements; and (g) emptying the slurry from the pressure vessel, whereby, the portion of back-flushing liquid remaining within the interior of the filter elements flows down the interior of the filter elements for conduction out of the pressure vessel, and the portion of back-flushing liquid remaining within the interior of the filter elements is limited by the filling bodies, said filling bodies occupying a substantial portion and inner volume of said filter elements.

2. A method according to claim 1, wherein the supply of gas for drying the sludge cake is already initiated during the step of emptying of unfiltered suspension, the gas supplied at a pressure which is sufficient to prevent the sludge cake from falling down from the filter elements.

3. A method according to claim 1, wherein the back-flushing liquid is a secondary condensate or a medium which has been freed of filtrate chemicals.

4. A method according to claim 1, wherein the back-flushing liquid is directed in sequence to one or more sections of filter elements per constituent sequence.

5. A filtering apparatus, comprising:

a pressure vessel;

a plurality of filter elements arranged within said pressure vessel, said filter elements each having an upper end, a lower end and a side wall;

filling bodies positioned within said filter elements;

a first conduit for introducing compressed gas into said pressure vessel;

a second conduit for transporting unfiltered liquid to and from said pressure vessel; and a third conduit for removing filtrate from said pressure vessel and transporting back-flushing liquid to and from said filter elements, said third conduit positioned proximate to a bottom portion of said pressure vessel and attached to the lower ends of said filter elements, such that said third conduit provides a support structure for said filter elements and the back-flushing liquid introduced via said third conduit fills the filter elements in a direction from said lower ends toward said upper ends, the volume of back-flushing liquid introduced into said filter elements limited by said filling bodies, said filling bodies occupying a substantial portion and inner volume of said filter elements.

6. A filtering apparatus according to claim 5, wherein said third conduit is the only structure for supporting the filter elements.

7. A filtering apparatus according to claim 5, wherein said third conduit comprises a main conduit branching off into a series of subconduits, at least one of said subconduits passing through the wall of said pressure vessel.

8. A filtering apparatus as recited in claim 7, wherein at least one of said subconduits provides a passageway to a group of said filter elements.

9. A filtering apparatus according to claim 5, wherein the filter elements are tubular.

10. A filtering apparatus according to claim 5, wherein the filter elements are shaped from perforated plates having a layer of filter cloth affixed thereon.

11. A filtering apparatus according to claim 10, further comprising at least one layer of an underwire arranged between the filter cloth and the perforated plate, said layer of underwire having a coarser structure and greater permeability than the filter cloth.

12. A filtering apparatus according to claim 5, wherein said filling bodies are designed to fill up an internal space of the filter elements, such that a narrow gap is formed between each filling body and respective filter element side wall.

13. A filtering apparatus according to claim 5, wherein the filling bodies are arranged to constitute members which stiffen the filter elements.

14. A filtering apparatus according to claim 5, wherein the filling bodies consist of elements of expanded synthetic material.

15. A filtering apparatus according to claim 5, further comprising a fan which is arranged to generate compressed gas for drying deposited sludge cake.

16. A filtering apparatus according to claim 15, wherein the fan is arranged to generate a pressure which is adapted to permit retention of sludge cake on the filter elements while emptying unfiltered suspension and drying said sludge cake.

17. A filtering apparatus according to claim 16, wherein the filter elements are divided into sections to which the back-flushing liquid can be directed in sequence.

* * * * *